United States Patent
Yang

(10) Patent No.: US 11,300,081 B1
(45) Date of Patent: Apr. 12, 2022

(54) ENGINE INTAKE BYPASS SYSTEM

(71) Applicants: HYUNDAI MOTOR COMPANY, Seoul (KR); KIA MOTORS CORPORATION, Seoul (KR)

(72) Inventor: Il Suk Yang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/188,142

(22) Filed: Mar. 1, 2021

(30) Foreign Application Priority Data

Sep. 29, 2020 (KR) .................. 10-2020-0126936

(51) Int. Cl.
*F02M 35/10* (2006.01)
*F02B 29/04* (2006.01)

(52) U.S. Cl.
CPC ... *F02M 35/10163* (2013.01); *F02B 29/0437* (2013.01); *F02B 29/0462* (2013.01); *F02M 35/10072* (2013.01); *F02M 35/10255* (2013.01)

(58) Field of Classification Search
CPC ........ F02M 35/10072; F02M 35/10163; F02B 29/0462; F02B 29/0437
See application file for complete search history.

(56) References Cited

U.S. PATENT DOCUMENTS

| 2006/0157036 A1* | 7/2006 | Andersen ................ F02B 67/10 |
| | | 123/563 |
| 2015/0075750 A1* | 3/2015 | Bruggesser ......... F02B 29/0475 |
| | | 165/104.14 |

FOREIGN PATENT DOCUMENTS

KR    10-2016-0033432 A    3/2016

* cited by examiner

*Primary Examiner* — Kevin A Lathers
(74) *Attorney, Agent, or Firm* — Lempia Summerfield Katz LLC

(57) ABSTRACT

An engine intake bypass system includes: an inlet pipe that supplies air, which passes through a throttle valve, to an intake manifold via a supercharging device along a first path, and directly supplies the air having passed through the throttle valve the intake manifold after bypassing the supercharging device along a second path; a bypass duct disposed in the second path to receive the air from the inlet pipe and deliver the air to the intake manifold in parallel; and a bypass valve installed to interrupt the air supplied to the bypass duct.

10 Claims, 9 Drawing Sheets

ENGINE INTAKE BYPASS SYSTEM

CROSS REFERENCE TO RELATED APPLICATION

This application claims priority to and the benefit of Korean Patent Application No. 10-2020-0126936, filed on Sep. 29, 2020, the entire contents of which are incorporated herein by reference.

FIELD

The present disclosure relates to an intake system of an engine, and more particularly, to a technology regarding an intake structure of an engine provided with a supercharging device.

BACKGROUND

The statements in this section merely provide background information related to the present disclosure and may not constitute prior art.

Supercharging devices for increasing the amount of air flowing into engines include turbochargers that compress intake air by using the energy of exhaust gas discharged from engines, and superchargers that compress intake air by using a different power source without using exhaust gas.

Turbochargers have a side effect in that, since exhaust gas is used, engine back pressure is increased, and an increased amount of gas remains in the combustion chamber. As such, turbochargers are inappropriate for lean burn or super-lean burn of gasoline engines.

Superchargers include a mechanical supercharger, which is driven by rotational power delivered from the engine crankshaft via a belt or the like. Such mechanical superchargers have a limitation in that, since the engine RPM is limited, it is difficult to secure the supercharging flow rate desired for high-speed engine operation.

Meanwhile, an electrically-powered supercharger is driven by an electric motor, regardless of the engine, and thus can be controlled independently of the engine operating state. However, the electrically-powered supercharger depends on the amount of power remaining in the vehicle, which can be used to drive the motor, and this may cause a situation in which it is difficult to implement a continuously supercharged state. In addition, the limited motor RPM makes it difficult to satisfy the supercharging flow rate desired in high-speed operation areas.

In connection with the gasoline lean-burn engine mentioned above, neither the mechanical supercharger nor the electrically-powered supercharger can provide the level of supercharging desired in every engine operating area. Particularly, we have discovered that in the high-speed heavily-loaded area of the engine, a flow rate loss occurs due to a flow resistance occurring when intake air passes through the supercharging device, the intercooler, and the like. This may cause a situation in which the intake flow rate is less than that in the case of natural aspiration.

The above descriptions regarding background arts are only for helping understanding of the background of the present disclosure, and are not to be considered by a person skilled in the art as corresponding to already-known prior arts.

SUMMARY

The present disclosure provides an engine intake bypass system wherein a supercharging pressure can be supplied to the engine by using a supercharging device, and air drawn to the engine can bypass the supercharging device such that a naturally aspirated type intake state can be reached depending on the engine operating situation. As a result, intake air can be supplied to the combustion chamber more efficiently in the naturally aspirated type under an operating condition in which the supercharging device cannot provide a sufficient supercharging flow rate, for example, thereby improving the engine performance in broader operating areas.

In one form of the present disclosure, an engine intake bypass system may include: an inlet pipe configured to branch air, which passes through a throttle valve, to a first path, along which the air is supplied to an intake manifold via a supercharging device, and a second path, along which the air is supplied to the intake manifold after bypassing the supercharging device; a bypass duct installed to receive the air from the inlet pipe on the second path and deliver the air to the intake manifold in parallel; and a bypass valve installed to interrupt the air supplied to the bypass duct. The intake manifold may include a first integration space, in which the air supplied in parallel from the bypass duct and the air supplied via the supercharging device are integrated, and discharge runners running from the first integration space to respective combustion chambers may be branched.

A plurality of intake runners for receiving the air in parallel from the bypass duct may be formed in the intake manifold, the bypass duct ma include a second integration space, with which the plurality of intake runners communicate together, and a plurality of communication runners may be formed in the bypass duct such that the air, which passes through the bypass valve, is delivered in parallel to the second integration space.

The numbers of the communication runners, the intake runners, and the discharge runners gradually may increase in the sequence of the communication runners, the intake runners, and the discharge runners.

The discharge runners may be linearly arranged at a predetermined interval, the intake runners may be arranged between the discharge runners to be linearly arranged at a predetermined interval, and the communication runners may be arranged between the intake runners to be linearly arranged at a predetermined interval.

The inlet pipe may include: a coupling flange coupled to the throttle valve; a first linear part configured to couple a first hose defining the first path on a downstream side of the coupling flange; and a second linear part branched from the first path and configured to couple a second hose defining the second path.

The engine intake bypass system may further include an intercooler coupled to the intake manifold to define the first integration space together with the intake manifold and configured to cool the air supplied via the supercharging device and supply the cooled air to the first integration space.

The engine intake bypass system of claim 6 may further include: a surge tank coupled to the intercooler while forming a gradually increasing flow cross-section such that the air is supplied from the supercharging device and is uniformly introduced into the intercooler.

The cross-sectional shape of a portion of the intercooler, to which the surge tank is coupled, may be a shape corresponding to a shape of the first integration space, which is opened toward the intercooler, such that the flows of the air linearly pass through the intercooler in parallel and are linearly introduced into the first integration space of the intake manifold.

The intercooler may be configured such that cooling water is introduced and discharged in a direction that is perpendicular to the flow direction of the air, which is introduced from the surge tank into the intake manifold after passing through the intercooler.

A cooling water inlet and a cooling water outlet of the intercooler may be formed on the same surface of the intercooler to be adjacent to each other.

The surge tank may include a third linear part, to which a third hose is coupled, to receive supercharged air from the supercharging device.

The present disclosure is advantageous in that a supercharging pressure can be supplied to the engine by using a supercharging device, and air drawn to the engine can bypass the supercharging device such that a naturally aspirated type intake state can be reached depending on the engine operating situation. As a result, intake air can be supplied to the combustion chamber more efficiently in the naturally aspirated type under an operating condition in which the supercharging device cannot provide a sufficient supercharging flow rate, for example, thereby improving the engine performance in broader operating areas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
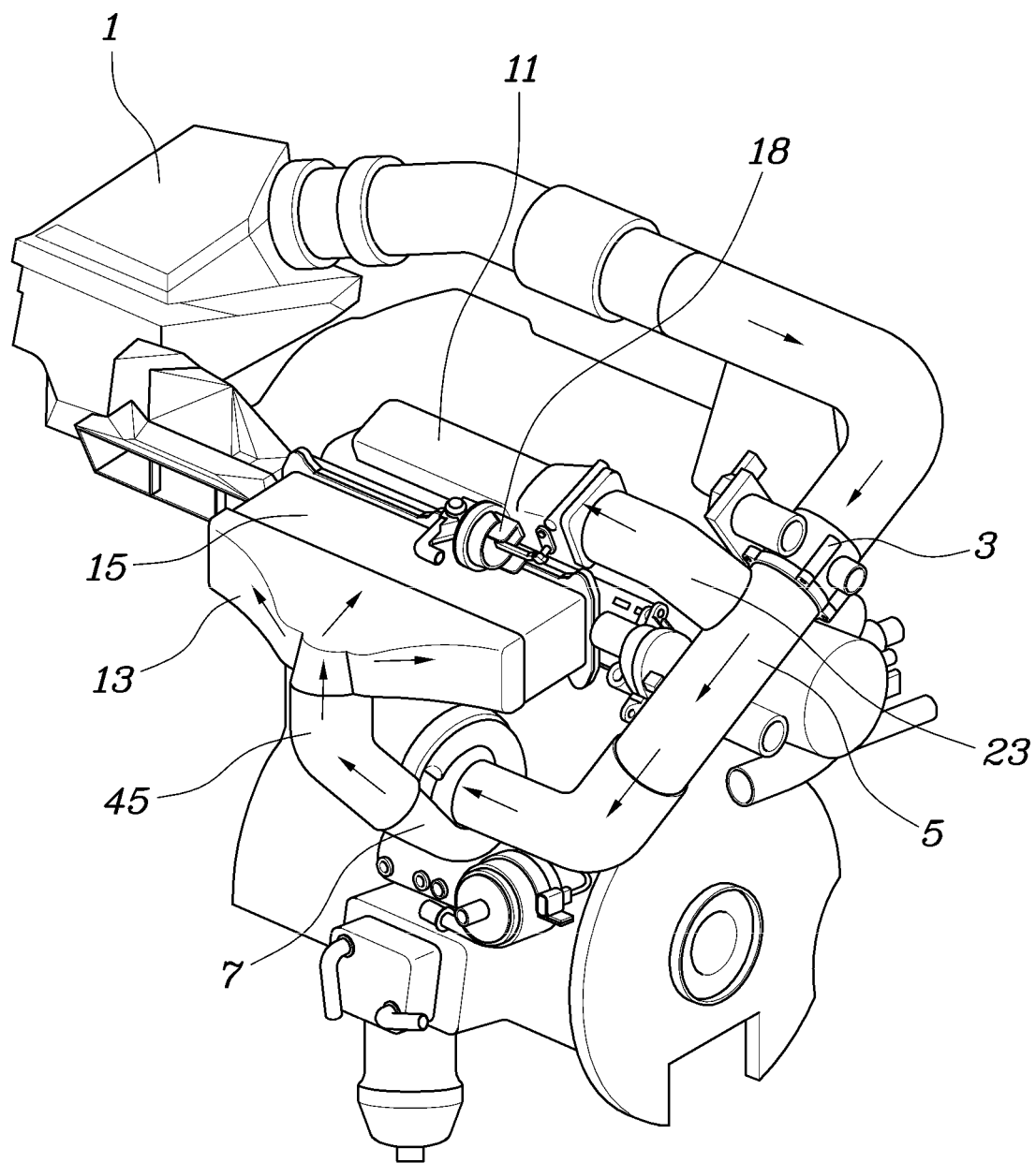
FIG. 1 is a view illustrating an engine in one form of the present disclosure.
Figure 2:
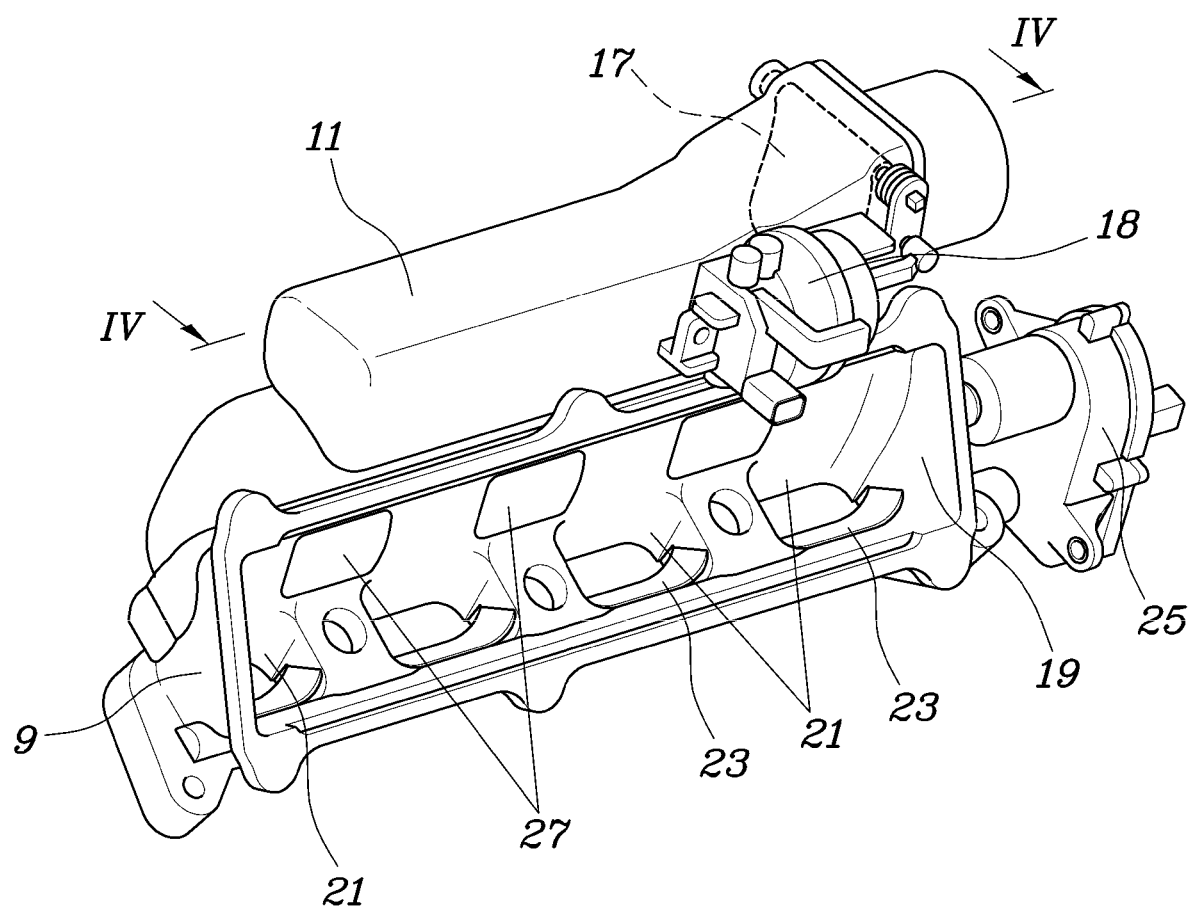
FIG. 2 is a view illustrating a bypass duct and an intake manifold of FIG. 1.
Figure 3:
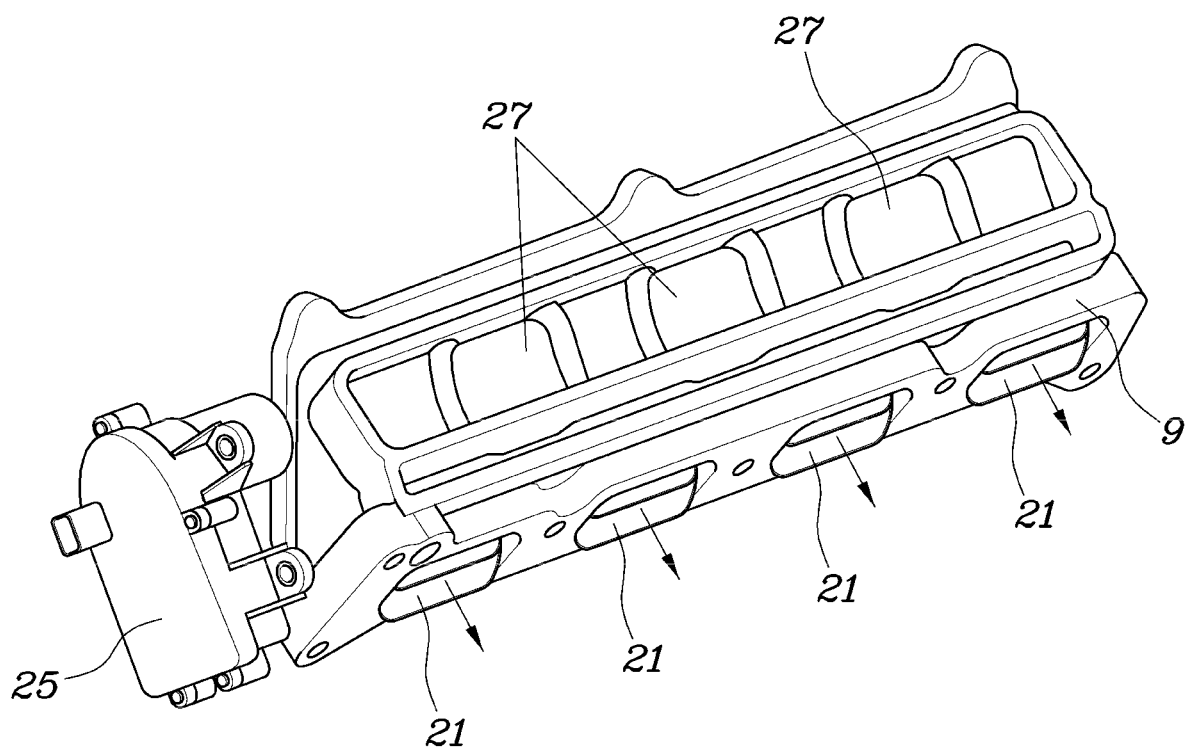
FIG. 3 is a view illustrating the intake manifold of FIG. 2 viewed from an opposite side.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an engine, to which the present disclosure is applied, is configured such that if air filtered through an air cleaner 1 is introduced after being adjusted by a throttle valve 3, the air in an inlet pipe 5 is supplied to a supercharging device 7 or a bypass duct 11 that causes the air to bypass the supercharging device 7 to be supplied directly to the intake manifold 9.

A supercharger may be used as the supercharging device 7, and the air that passes through the supercharging device 7 is supplied to the intake manifold 9 via the surge tank 13 and the intercooler 15 and the intake manifold 9 distributes and supplies the air to respective combustion chambers of the engine.

Referring to FIGS. 1 to 9, the engine intake bypass system according to one form of the present disclosure includes an inlet pipe 5 configured to branch air, which passes through a throttle valve 3, to a first path, along which the air is supplied to an intake manifold 9 via a supercharging device 7, and a second path, along which the air is supplied to the intake manifold 9 after bypassing the supercharging device 7, a bypass duct 11 installed to receive the air from the inlet pipe 5 on the second path and deliver the air to the intake manifold 9 in parallel, and a bypass valve 17 installed to interrupt the air supplied to the bypass duct 11.

That is, according to forms of the present disclosure, a supercharged state in which the air in the inlet pipe 5 is supplied to the supercharging device 7 through the first path and a bypass state in which the air is not supplied to the supercharging device 7 but is directly supplied to the intake manifold 9 through the second path are converted by the bypass valve 17, whereby the performance of the engine can be improved in a broader operating area by efficiently supplying intake air into the combustion chambers in a naturally aspirated type under an operating condition in which it is difficult for the supercharging device 7 to provide a sufficient supercharging flow rate.

Accordingly, in the supercharged state, all the air that passes through the throttle valve 3 is supercharged by the supercharging device 7 to be supplied into the intake manifold 9 by interrupting the air supplied from the inlet pipe 5 to the bypass duct 11 with the bypass valve 17, and in the bypass state, the air that passes through the throttle valve 3 is supplied to the intake manifold 9 through the bypass duct 11 by opening the bypass valve 17.

Since the second path through the supercharging device 7 is not interrupted in the bypass state, a portion of the air meets the air supplied through the bypass duct 11 in the intake manifold 9 through the second path, and the intake manifold 9 includes a first integration space 19, in which the air supplied in parallel from the bypass duct 11 and the air supplied via the supercharging device 7 may be integrated.

In addition, the intake manifold 9 has discharge runners 21 that each connect the first integration space 19 to the respective combustion chambers of the engine.

For reference, each of the discharge runners 21 is provided with a tumble valve 23 for forming a tumble in the combustion chamber, and a tumble actuator 25 that drives the tumble valve 23 is also illustrated.

Further, the bypass valve 17 is driven by a bypass actuator 18, and the bypass actuator 18 may be automatically driven by a supercharging pressure formed by the supercharging device 7 or may be electrically driven under the control of a separate controller.

A plurality of intake runners 27 for receiving the air in parallel from the bypass duct 11 are formed in the intake manifold 9, the bypass duct 11 includes a second integration space 29, with which the plurality of intake runners 27 communicate together, and a plurality of communication runners 31 are formed in the bypass duct 11 such that the air, which passes through the bypass valve 17, is delivered in parallel to the second integration space 29.

Accordingly, the air introduced into the bypass duct 11 through the bypass valve 17 is introduced into the second integration space 29 through the plurality of communication runners 31, the air in the second integration space 29 is introduced into the first integration space 19 through the intake runners 27 of the intake manifold 9, and the air introduced into the first integration space 19 is supplied to the respective combustion chambers through the discharge runners 21.

In one form, the numbers of the communication runners 31, the intake runners 27, and the discharge runners 21 gradually increase in the sequence of the communication runners 31, the intake runners 27, and the discharge runners 21.

That is, the number of the communication runners 31 is two, the number of the intake runners 27 is three, and the number of the discharge runners 21 is four, and the flow resistance of the air significantly decreases as the air introduced into the bypass duct 11 through one passage flows through the passages, the number of which gradually increases while the air sequentially flows from the bypass duct 11 to the two communication runners 31, the second integration space 29, the three intake runners 27, the first integration space 19, and the four discharge runners 21 in the sequence thereof, whereby the intake efficiency of the combustion chambers can be improved.

Figure 4:
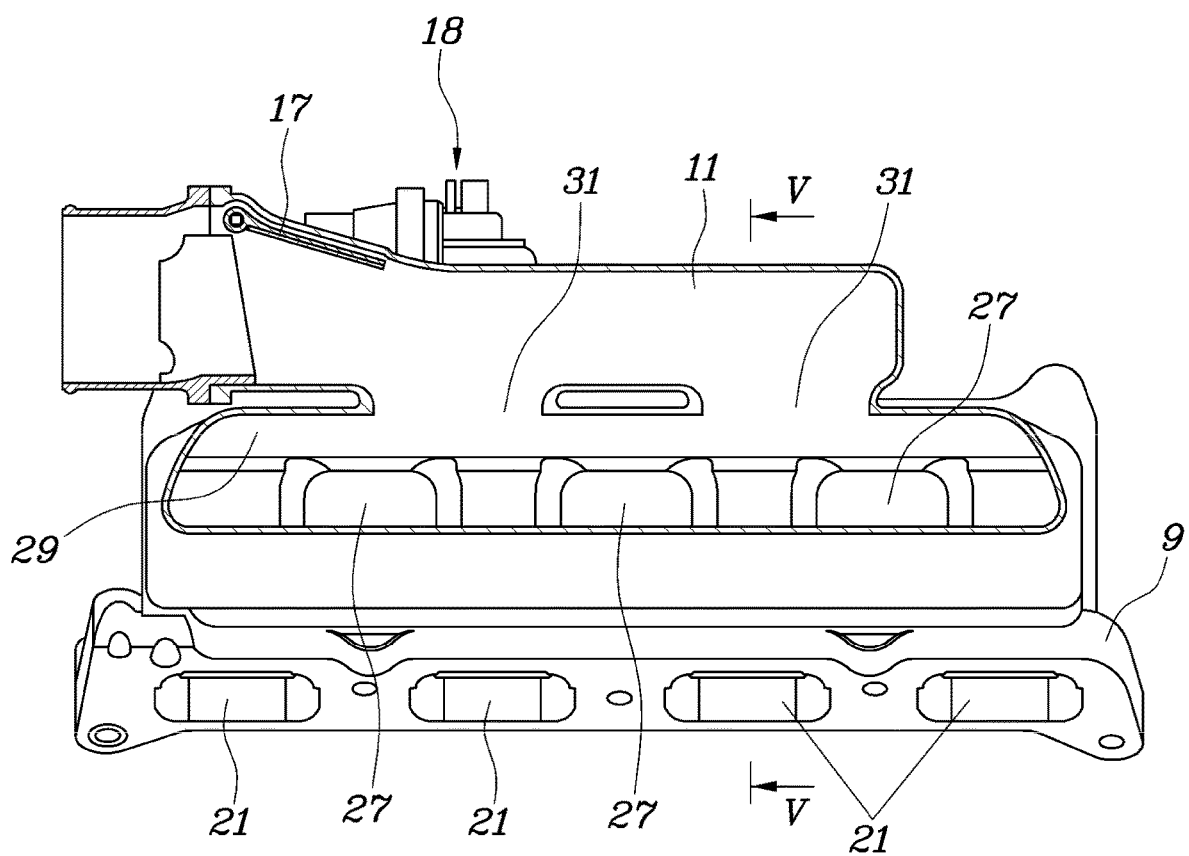
FIG. 4 is a cross-sectional view taken along line IV-IV of FIG. 2.
Figure 5:
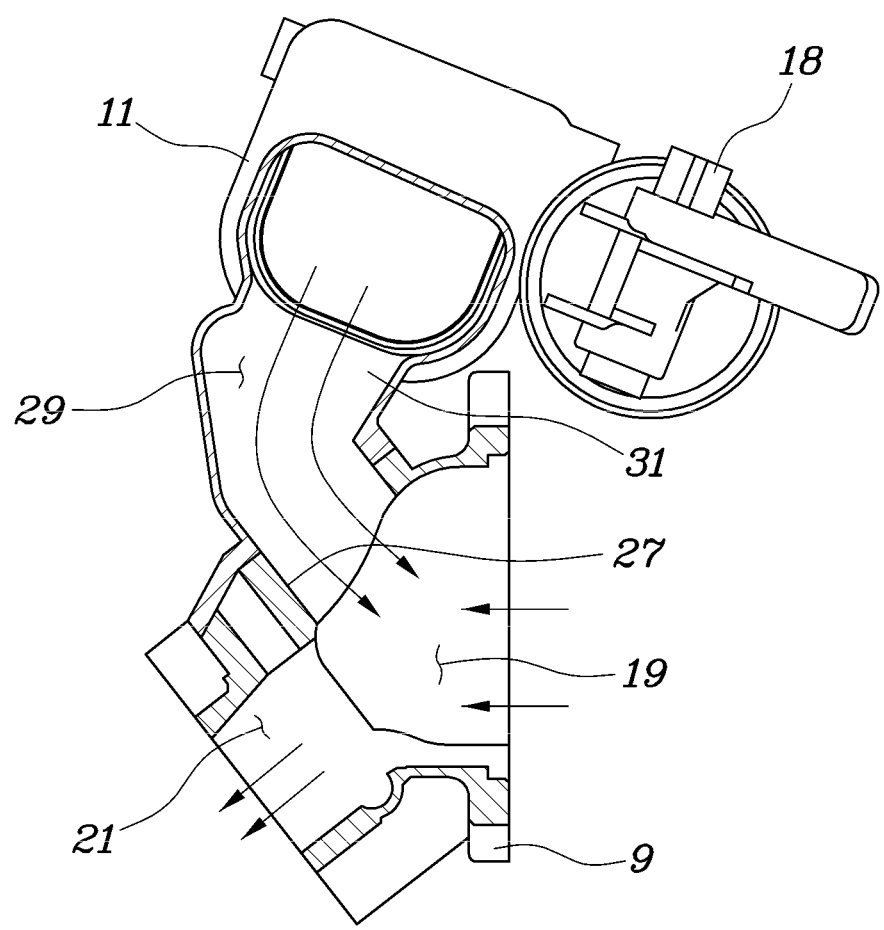
FIG. 5 is a cross-sectional view taken along line V-V of FIG. 4.
Figure 6:
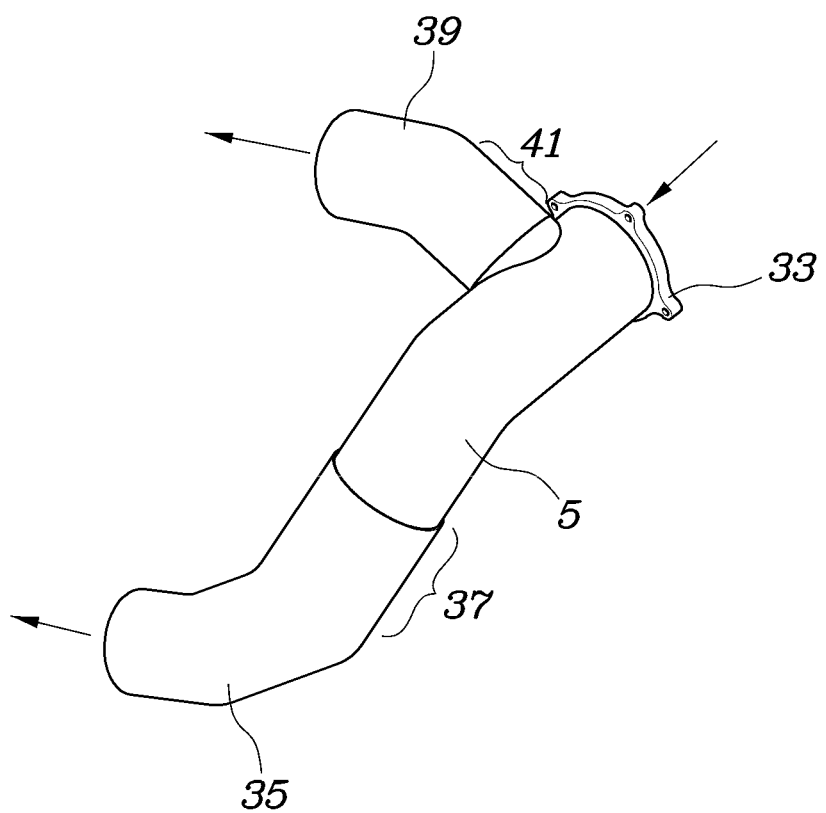
FIG. 6 is a view illustrating an inlet pipe of FIG. 1.

Further, in another form, as can be seen in FIG. 4, the discharge runners 21 are linearly arranged at a predetermined interval, the intake runners 27 are arranged between the discharge runners 21 to be linearly arranged at a predetermined interval, and the communication runners 31 are arranged between the intake runners 27 to be linearly arranged at a predetermined interval.

Accordingly, as described above, because the flow path of the air that sequentially passes from the bypass duct 11 through the communication runners 31, the intake runners 27, and the discharge runners 21 is as linear as possible, flow resistance can be minimized, and because the air is supplied while being uniformly distributed when the air is finally supplied to the combustion chambers through the discharge runners 21, the noise and vibration of the engine is reduced due to uniform outputs of the combustion chambers of the engine and a stable output performance can be secured.

The inlet pipe 5 includes a coupling flange 33 coupled to the throttle valve 3, a first linear part 37, to which a first hose 35 that defines the first path on the downstream side of the coupling flange 33 is coupled, and a second linear part 41, to which a second hose 39 that is branched from the first path to define the second path is coupled.

That is, the degree of freedom of a location, at which the bypass duct 11 and the supercharging device 7 are fixed to the engine, can be secured through the configuration, in which the first linear part 37 of the inlet pipe 5 is connected to the bypass duct 11 through the first hose 35 and the second linear part 41 is connected to the supercharging device 7 through the second hose 39, whereby the locations of the bypass duct 11 and the supercharging device 7 can be selected such that a compacter engine may be constituted.

Figure 7:
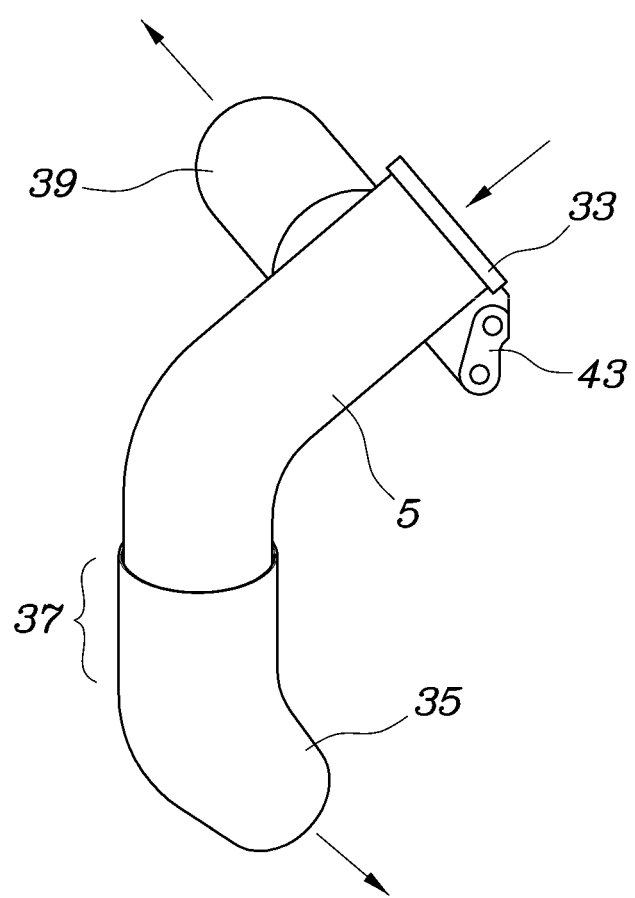
FIG. 7 is a view illustrating the inlet pipe of FIG. 6 at a different angle.

As illustrated in FIG. 7, a fixing bracket 43 is integrally formed with the inlet pipe 5 so that the inlet pipe 5 may be directly fixed to a cylinder block, whereby a structure that is more robust to vibration can be secured by securing a firm fixing state of the inlet pipe 5 that is a weight object.

In another form, an intercooler 15 is coupled to the intake manifold 9 to define the first integration space 19 together with the intake manifold 9 and configured to cool the air supplied via the supercharging device 7 and supply the air to the first integration space 19, and a surge tank 13 is coupled to the intercooler 15 while defining a gradually increasing flow cross-section to receive the air from the supercharging device 7 and uniformly introduce the air to the intercooler 15.

The cross-sectional shape of a part of the intercooler 15, to which the surge tank 13 is coupled, is a shape corresponding to the shape of the first integration space 19, which is opened toward the intercooler 15, such that the flows of the air linearly pass through the intercooler 15 in parallel to each other to be linearly introduced into the first integration space 19 of the intake manifold 9.

Further, the surge tank 13 includes a third linear part 47, to which the third hose 45 is coupled, to receive the supercharged air from the supercharging device 7.

Accordingly, because the supercharged air introduced into the third linear part 47 from the supercharging device 7 through the third hose 45 passes through the intercooler 15 while being uniformly distributed to the entire area of the intercooler 15 after the flow cross-section of the air is increased while the air passes through the surge tank 13, the air is cooled at a cooling efficiency that is uniform and high as a whole, whereby the intake efficiency of the combustion chambers can be improved.

The supercharged air is introduced into the first integration space 19 of the intake manifold 9 as soon as it is cooled in the intercooler 15, and then is supplied to the respective combustion chambers through the discharge runners 21.

In the present form, the intercooler 15 is configured such that the cooling water is introduced and discharged in a direction that is perpendicular to the flow direction of the air that is introduced into the intake manifold 9 after passing from the surge tank 13 through the intercooler 15.

Figure 8:
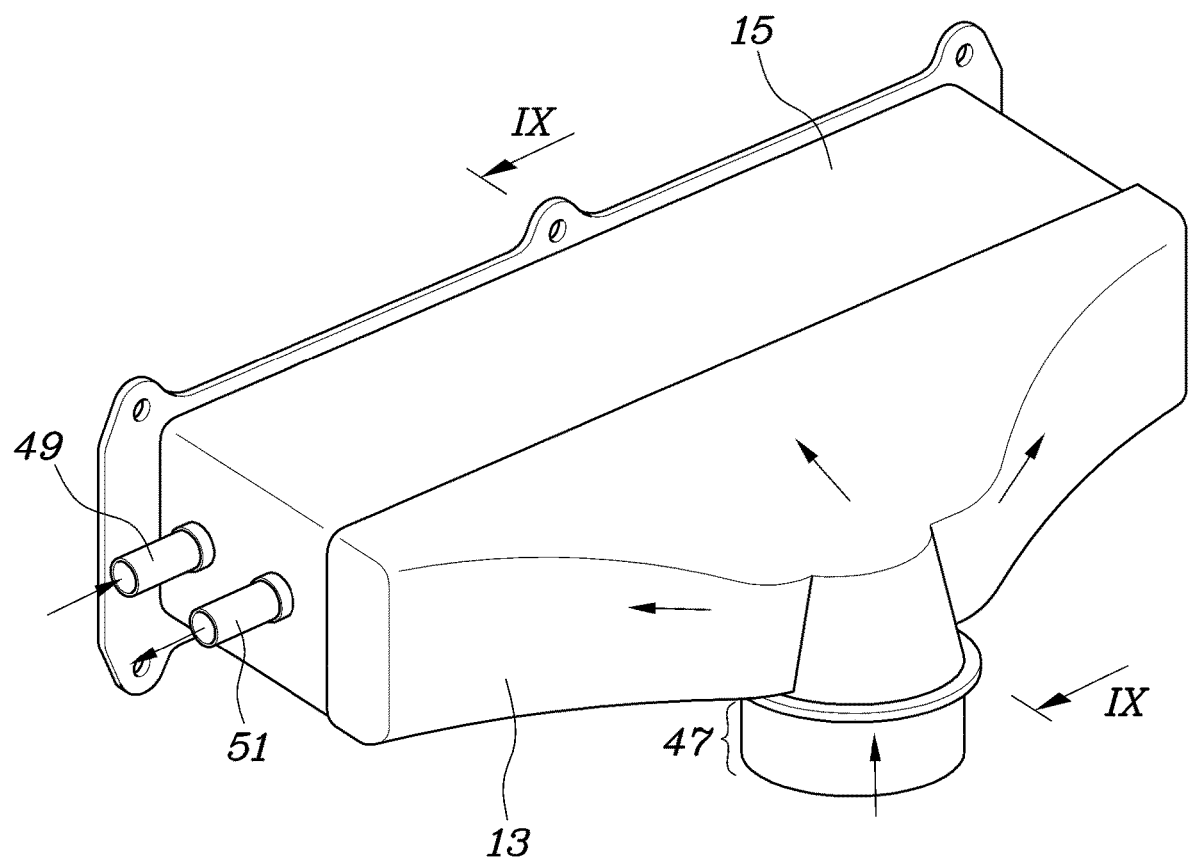
FIG. 8 is a view illustrating an intercooler and a surge tank of FIG. 1.

In addition, a cooling water inlet 49 and a cooling water outlet 51 of the intercooler 15, as illustrated in FIG. 8, may be formed on the same surface of the intercooler 15 to be adjacent to each other.

Accordingly, because the flow direction of the cooling water is a direction that is perpendicular to the flow direction of the air cooled while passing through the intercooler 15 even in the intercooler 15, the passing air can be uniformly cooled in the entire intercooler 15, whereby the cooling water can be easily supplied, the recovery pipeline can be easily treated and assembled, and the engine can be constituted compactly.

Figure 9:
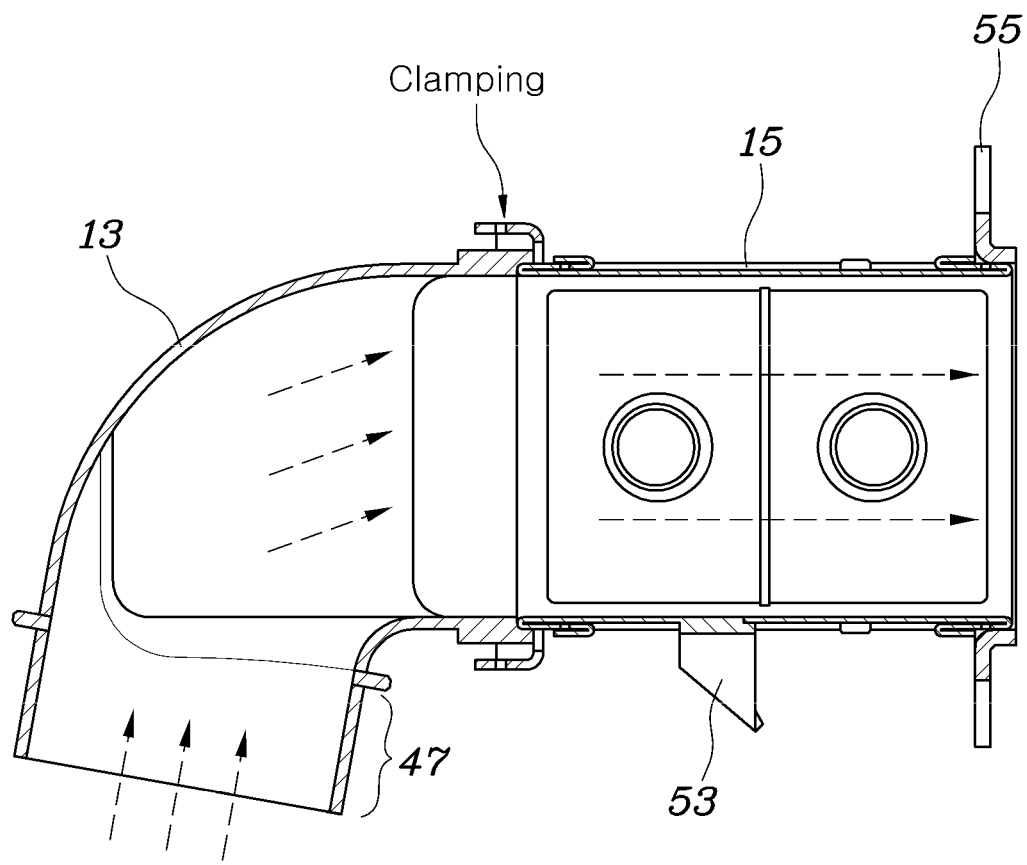
FIG. 9 is a cross-sectional view taken along line IX-IX of FIG. 8.

Referring to FIG. 9, a stay bracket 53 may be provided on the lower side of the intercooler 15 such that the intercooler 15, the intake manifold 9, and the surge tank 13 are supported together through the stay bracket 53, and the intercooler 15 and the surge tank 13 may be coupled to each other through clamping, and the intercooler 15 may be coupled to the intake manifold 9 by a thin plate flange 55 having a relatively small thickness.

The disclosed forms of the present disclosure do not limit the technical spirit of the present disclosure but are illustrative, and the scope of the technical spirit of the present disclosure is not limited by the exemplary forms of the present disclosure. The scope of the present disclosure should be construed by the claims, and it will be understood that all the technical spirits within the equivalent range fall within the scope of the present disclosure.

What is claimed is:

1. An engine intake bypass system comprising:
    an inlet pipe configured to:
        supply air having passed through a throttle valve to an intake manifold via a supercharging device along a first path, and directly supply the air having passed through the throttle valve to the intake manifold by bypassing the supercharging device along a second path;

a bypass duct disposed in the second path and configured to receive the air from the inlet pipe and deliver the air to the intake manifold; and a bypass valve configured to interrupt the air supplied to the bypass duct, wherein the intake manifold is provided with a first integration space where the air supplied from the bypass duct and the air supplied via the supercharging device are integrated, and the intake manifold comprises discharge runners each configured to connect the first integration space to respective combustion chambers, and wherein:

the intake manifold further includes intake runners configured to receive the air in parallel from the bypass duct, and the bypass duct comprises:

a second integration space by which the intake runners fluidly communicate with each other, and communication runners each configured to deliver the air having passed through the bypass valve to the second integration space.

2. The engine intake bypass system of claim 1, wherein:

a number of the communication runners is less than a number of the intake runners, and the number of the intake runners is less than a number of the discharge runners.

3. The engine intake bypass system of claim 2, wherein the discharge runners are linearly arranged at a predetermined interval, wherein the intake runners are arranged between the discharge runners to be linearly arranged at a predetermined interval, and wherein the communication runners are arranged between the intake runners to be linearly arranged at a predetermined interval.

4. The engine intake bypass system of claim 1, wherein the inlet pipe comprises:

a coupling flange coupled to the throttle valve;

a first linear part configured to couple a first hose defining the first path on a downstream side of the coupling flange; and a second linear part branched from the first path and configured to couple a second hose defining the second path.

5. The engine intake bypass system of claim 1, further comprising:

an intercooler coupled to the intake manifold to define the first integration space together with the intake manifold and configured to cool the air supplied via the supercharging device and supply the cooled air to the first integration space.

6. The engine intake bypass system of claim 5, further comprising:

a surge tank coupled to the intercooler while forming a gradually increasing flow cross-section such that the air is supplied from the supercharging device and is uniformly introduced into the intercooler.

7. The engine intake bypass system of claim 6, wherein a cross-sectional shape of a portion of the intercooler, to which the surge tank is coupled, corresponds to a shape of the first integration space, which is opened toward the intercooler, such that flows of the air linearly pass through the intercooler in parallel and are linearly introduced into the first integration space of the intake manifold.

8. The engine intake bypass system of claim 6, wherein the intercooler is configured such that cooling water is introduced and discharged in a direction that is perpendicular to a flow direction of the air, which is introduced from the surge tank into the intake manifold after passing through the intercooler.

9. The engine intake bypass system of claim 8, wherein a cooling water inlet and a cooling water outlet of the intercooler are formed on the same surface of the intercooler to be adjacent to each other.

10. The engine intake bypass system of claim 6, wherein the surge tank comprises a third linear part, to which a third hose is coupled, to receive supercharged air from the supercharging device.

* * * * *